(12) United States Patent
Miftakhov et al.

(10) Patent No.: US 10,025,277 B2
(45) Date of Patent: Jul. 17, 2018

(54) SYSTEMS AND METHODS FOR ELECTRICAL CHARGING LOAD MODELING SERVICES TO OPTIMIZE POWER GRID OBJECTIVES

(71) Applicant: Electric Motor Werks, Inc., San Carlos, CA (US)

(72) Inventors: Valery Miftakhov, San Carlos, CA (US); Alexander Gurzhi, San Jose, CA (US); Chris Edgette, Oakland, CA (US); Alan White, Tiburon, CA (US)

(73) Assignee: Electric Motor Werks, Inc., San Carlos, CA (US)

( * ) Notice: Subject to any disclaimer, the term of this patent is extended or adjusted under 35 U.S.C. 154(b) by 18 days.

(21) Appl. No.: 15/004,976

(22) Filed: Jan. 24, 2016

(65) Prior Publication Data
US 2017/0017213 A1 Jan. 19, 2017

Related U.S. Application Data

(63) Continuation-in-part of application No. 14/853,955, filed on Sep. 14, 2015.
(Continued)

(51) Int. Cl.
*H02J 7/00* (2006.01)
*G05B 13/04* (2006.01)
(Continued)

(52) U.S. Cl.
CPC ........ *G05B 13/041* (2013.01); *B60L 11/1809* (2013.01); *G05F 1/66* (2013.01);
(Continued)

(58) Field of Classification Search
USPC .................................................. 320/106–115
See application file for complete search history.

(56) References Cited

U.S. PATENT DOCUMENTS

| | | | |
|---|---|---|---|
| 2012/0133337 A1* | 5/2012 | Rombouts | H02J 3/32 320/155 |
| 2013/0179061 A1* | 7/2013 | Gadh | B60L 11/1842 701/123 |
| 2014/0062401 A1* | 3/2014 | Gadh | B60L 11/1838 320/109 |

\* cited by examiner

*Primary Examiner* — Binh Tat
(74) *Attorney, Agent, or Firm* — TransPacific Law Group; Pavel I. Pogodin, Esq.

(57) ABSTRACT

A system configured to receive and automatically analyze various types of information, including, without limitation, information from energy generators, information from non-generation resources, information on the facility status, information on user behavior, information on user's short-term energy needs (e.g. over-ride any algorithm due to immediate charging need), information on renewable generation, including, without limitation, solar, wind, biomass and/or hydro, and information on environmental conditions including, without limitation, barometric pressure, temperature, ambient light intensity, humidity, air speed, and air quality. In one or more embodiments, a sole novel charging station or selected, aggregated groupings of the aforesaid novel charging stations are configured to start, modulate or stop charging, or start, modulate (down) or stop discharging over specific time intervals based on the electrical grid needs as automatically determined based on the totality of the received diverse information. To this end, a system and an associated method are provided to perform complete electrical charging load modeling to optimize power grid objectives.

20 Claims, 5 Drawing Sheets

Related U.S. Application Data (60) Provisional application No. 62/050,147, filed on Sep. 14, 2014.

(51) Int. Cl.
*G07F 15/00* (2006.01)
*G05F 1/66* (2006.01)
*B60L 11/18* (2006.01)

(52) U.S. Cl.
CPC .......... *G07F 15/005* (2013.01); *H02J 7/0027* (2013.01); *G05B 2219/2637* (2013.01); *Y02P 80/21* (2015.11)

SYSTEMS AND METHODS FOR ELECTRICAL CHARGING LOAD MODELING SERVICES TO OPTIMIZE POWER GRID OBJECTIVES

CROSS-REFERENCE TO RELATED PATENT APPLICATION

This regular U.S. patent application relies upon, claims the benefit of priority from and is a continuation-in-part of U.S. patent application Ser. No. 14/853,955 filed on Sep. 14, 2015, which relies upon and claims the benefit of priority from U.S. provisional patent application No. 62/050,147, entitled "Grid Stabilization via a Large Distributed Collection of EV Charging Stations," filed on Sep. 14, 2014, both of which are incorporated by reference herein in their entirety. This patent application is also related to two U.S. patent applications entitled "SYSTEMS AND METHODS FOR LOCAL AUTONOMOUS RESPONSE TO GRID CONDITIONS BY ELECTRIC VEHICLE CHARGING STATIONSAS AND OTHER SIMILAR LOADS" and "COMPUTERIZED INFORMATION SYSTEM FOR SMART GRID INTEGRATED ELECTRIC VEHICLE CHARGING AND ASSOCIATED METHOD", filed on the same day and incorporated herein by reference.

BACKGROUND OF THE INVENTION

Field of the Invention

The disclosed embodiments relate in general to the field of electric charging technology, such as electric vehicle charging, as well as to power grid management and, more specifically, to systems and methods for electrical charging load modeling services to optimize power grid objectives.

Description of the Related Art

Today's power grid is generally managed pursuant to a top-down approach provided by Independent System Operators, Regional Transmission Operators, and Load Service Entities such as utilities, Microgrids and other large generation facilities. As distributed, local, and renewable generation and non-generating loads proliferate across territories, markets have the ability to use these resources to contribute to the supply-demand balance inherently needed for the electrical power grid. This includes but is not limited to the battery/load states connected to electric vehicle charging stations, Electric Vehicle Supply Equipment (EVSE), local battery storage, water heating, and pump storage.

A typical Electric Vehicle consumes ~10-15 KWHr of energy every day to recharge its batteries—this amount of energy is sufficient to provide ~30-50 miles of daily driving (which is consistent with a US average commute distances). A typical recharge time to transfer that amount of energy from the AC grid to the vehicle's battery is 90 minutes. However, the amount of time available for such a recharge is generally over 23 hours during a typical 24-hour day. Moreover, there are at least two blocks of this time when a typical EV spends 8+ hours in one location. These locations are usually the home of the driver and her workplace. This difference between time available and actual time required for charging creates an opportunity to reduce the instantaneous charging power and still satisfy the driver's requirements for a full vehicle battery recharge for the next day. In other words, if one were to spread the charging power uniformly over a 16-hour period (8 hours at work+8 hours at home), a typical EV can be recharged for a day of driving at just 0.6 kW average charging power.

This ability to reduce instantaneous charging power can be utilized to modulate the instantaneous electrical power drawn by a fleet of EVs by modulating charging current for each EV via EV charging stations. Such modulation capability can then be used to provide various stabilization services to the Electrical Grid (e.g., Demand Management, Frequency Regulation, Peak Shaving, Economic Demand Response, etc.). Similar to EVs, charging of other energy storage devices, such as home energy storage batteries, such as Tesla Power Wall, may also be modulated to stabilize the Electrical Grid.

Today's technology addresses these assets using binary communication that lacks an overall understanding of the objectives of each stakeholder, including the larger power grid, connected and islanded micro-grids, substations, renewable generation farms/facilities, local premises, consumer/commercial/industrial energy customers, and the generation or storage needs of each asset. Today's equipment that provides charging services has no capability to communicate nor receive inputs to identify optimal charging needs for any reason. Nor does it collect usage pattern data from a specific user or groups of users. Nor does it address existing conditions such as climate/weather, current economic needs of each stakeholder, or environmental conditions. Examples of such objectives include grid energy balancing, revenue maximization for the operator of the grid on both the wholesale and retail levels, protection or deferment of critical infrastructure, or environmental goals such as greenhouse gas emission mitigation. As a result, the time and rate of charge required to optimize all needs is not clear or well understood due to a lack of data or the ability to process the data.

Therefore, new and improved systems and methods for incorporating disparate data streams to maximize the benefits of each component of the distributed power generation and storage are needed.

SUMMARY OF THE INVENTION

The inventive methodology is directed to methods and systems that substantially obviate one or more of the above and other problems associated with conventional systems and methods for electrical vehicle charging and power grid management.

In accordance with one aspect of the embodiments described herein, there is provided a computerized system for electrical charging load modeling to optimize power grid objectives, the system incorporating a plurality of charging assets; and a cloud server comprising at least one processing unit, the cloud server incorporating: a data aggregation module configured to collect and aggregate a plurality of information items; an analytics module configured to identify at least one temporal model associated with the data collected and aggregated by the data aggregation module; a charging module configured to determine a charging pattern for each of the plurality of charging assets, the charging pattern comprising information on time intervals when each of the plurality of charging assets is to be charged, including the beginning and ending times of the charging operation and information on a level of charging during each charging time interval; a charger asset module configured to control charging of the plurality of charging assets in accordance with the determined charging patterns by issuing a control command to each of the plurality of charging assets; and a communication module for communicating the control command issued by the charger asset module to the respective charging asset via a data network.

In one or more embodiments, the plurality of information items comprises a power grid data.

In one or more embodiments, the plurality of information items comprises a data collected from local grids, the local grids comprising residential renewables, local or regional microgrids.

In one or more embodiments, the plurality of information items comprises data originating from an external environment.

In one or more embodiments, the data originating from an external environment comprises weather-related information, solar activity information, cloud-cover information or earthquake information.

In one or more embodiments, the plurality of information items comprises data representing energy needs of individual or groups of electric energy users.

In one or more embodiments, the plurality of information items comprises data on specific users of electrical power and their individual behavior.

In one or more embodiments, the plurality of information items comprises data on energy storage, including any available EV batteries, power storage batteries, as well as data on any energy coming from Load-Serving-Entities.

In one or more embodiments, the plurality of information items comprises data on a specific one of the plurality of charging assets.

In one or more embodiments, the plurality of information items comprises data on a power grid priorities.

In one or more embodiments, the data on a power grid priorities comprises information on maximization of revenue, protecting assets, balancing energy, reducing emissions, or delivering ancillary services.

In accordance with another aspect of the embodiments described herein, there is provided a computer-implemented method for electrical charging load modeling to optimize power grid objectives, the method being performed in connection with a plurality of charging assets and a cloud server incorporating at least one processing unit, the method involving: collecting and aggregating a plurality of information items; identifying at least one temporal model associated with the collected and aggregated plurality of information items; determining a charging pattern for each of the plurality of charging assets, the charging pattern comprising information on time intervals when each of the plurality of charging assets is to be charged, including the beginning and ending times of the charging operation and information on a level of charging during each charging time interval; controlling charging of the plurality of charging assets in accordance with the determined charging patterns by issuing a control command to each of the plurality of charging assets; and communicating the control command issued by the charger asset module to the respective charging asset via a data network.

In one or more embodiments, the plurality of information items comprises a power grid data.

In one or more embodiments, the plurality of information items comprises a data collected from local grids, the local grids comprising residential renewables, local or regional microgrids.

In one or more embodiments, the plurality of information items comprises data originating from an external environment.

In one or more embodiments, the data originating from an external environment comprises weather-related information, solar activity information, cloud-cover information or earthquake information.

In one or more embodiments, the plurality of information items comprises data representing energy needs of individual or groups of electric energy users.

In one or more embodiments, the plurality of information items comprises data on specific users of electrical power and their individual behavior.

In one or more embodiments, the plurality of information items comprises data on energy storage, including any available EV batteries, power storage batteries, as well as data on any energy coming from Load-Serving-Entities.

In one or more embodiments, the plurality of information items comprises data on a specific one of the plurality of charging assets.

In one or more embodiments, the plurality of information items comprises data on a power grid priorities.

In one or more embodiments, the data on a power grid priorities comprises information on maximization of revenue, protecting assets, balancing energy, reducing emissions, or delivering ancillary services.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically.

DETAILED DESCRIPTION

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense.

In accordance with one aspect of the embodiments described herein, there is provided a novel system, which is configured to receive and automatically analyze various types of information, including, without limitation, information from energy generators, information from non-generation resources, information on the facility status, information on user behavior, information on user's short-term energy needs (e.g. over-ride any algorithm due to immediate charging need), information on renewable generation, including, without limitation, solar, wind, biomass and/or hydro, and information on environmental conditions including, without limitation, barometric pressure, temperature, ambient light intensity, humidity, air speed, and air quality. In one or more embodiments, a sole novel charging station or selected, aggregated groupings of the aforesaid novel charging stations are configured to start, modulate or stop charging, or start, modulate (down) or stop discharging over specific time intervals based on the electrical grid needs as automatically determined based on the totality of the received diverse information. To this end, a system and an associated method are provided to perform complete electrical charging load modeling to optimize power grid objectives.

Figure 1:
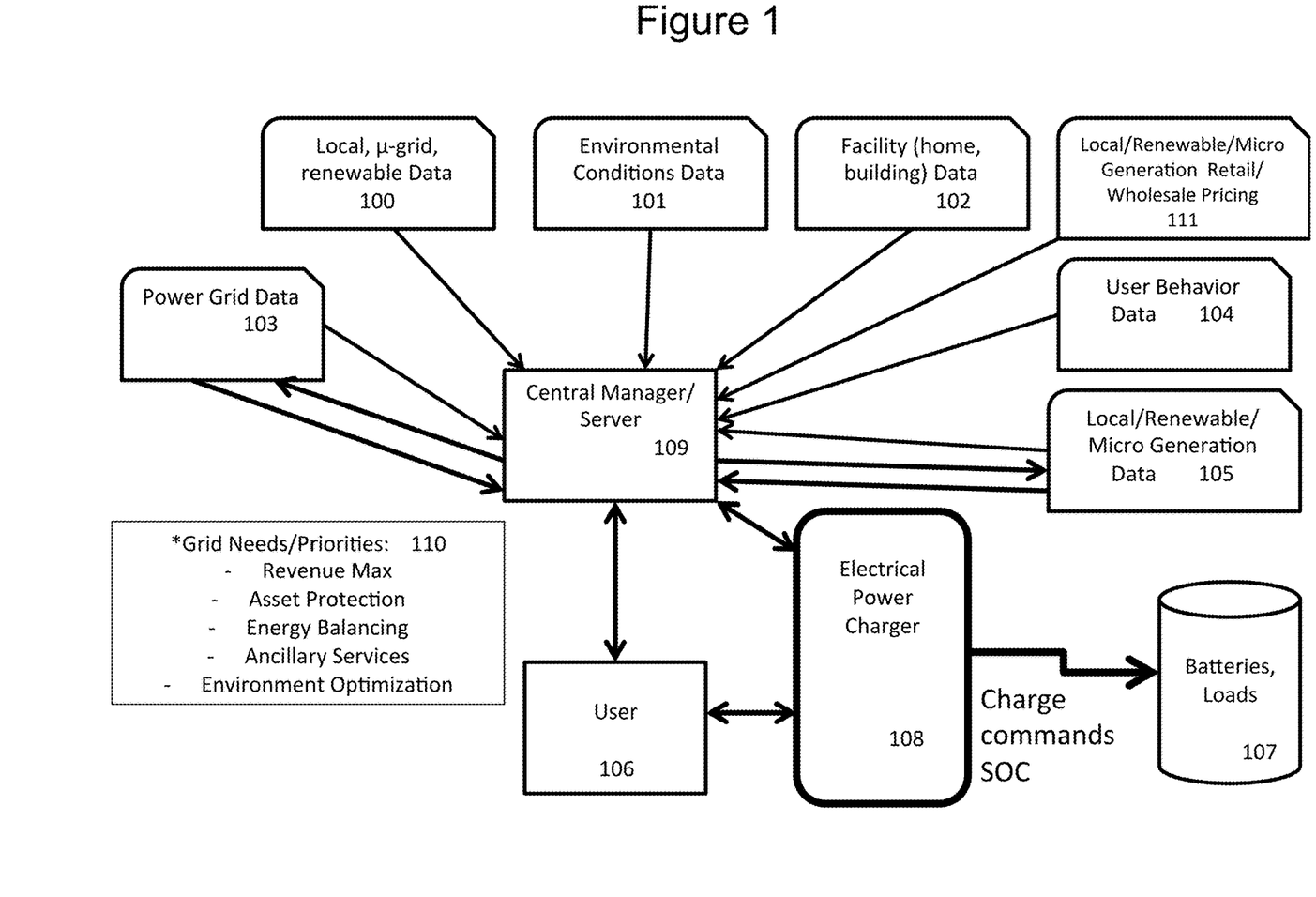
FIG. 1 illustrates a logical diagram of an exemplary embodiment of a computerized system for electrical charging load modeling services to optimize power grid objectives.

FIG. 1 illustrates a logical diagram of an exemplary embodiment of a computerized system for complete electrical charging load modeling to optimize electric power grid objectives. In one or more embodiments, the system shown in FIG. 1 incorporates a cloud-based server 109 which is configured to collect and analyze the aforesaid various types of information and to generate output, including commands for controlling electrical power charger 108 in a manner that advances the power grid objectives. To this end, the cloud-based server 109 executes one or more software modules that implement algorithms developed based on the systems and methods described herein.

As shown in FIG. 1, in one or more embodiments, the cloud-based server 109 receives power grid data 103, which could be various data coming from traditional power grids. In various embodiments, the power grid data 103 could include one or more readings from one or more sensors disposed within the aforesaid power grid. The aforesaid power grid data 103 as well as any other data described herein may be received by the cloud-based server 109 via a wired or wireless computer data network connection, which are well known to persons of ordinary skill in the art. In one or more embodiments, the aforesaid power grid data 103 is collected from transmission or distribution assets of the grid.

In addition to the power grid data 103, the cloud-based server 109 receives data 100 collected from various local grids, including residential renewables, local or regional microgrids. In addition, in one or more embodiments, the cloud-based server 109 receives data 101, which includes various data originating from the external environment, including, without limitation, weather-related information, such as wind information, including direction, speed and gusts, solar activity information, cloud-cover information, earthquake information, as well as news-feeds, and any other information relevant to the operation of the electrical grid.

Yet additionally, in one or more embodiments, the cloud-based server 109 receives information on load-receiving entities such as residences, commercial buildings, and industrial facilities. Such data may include the number and types of such entities, their respective energy demands and patterns of energy usage during various time periods, including daily and seasonal energy usage patterns.

Furthermore, in one or more embodiments, the cloud-based server 109 additionally receives information on electric energy unit pricing from wholesale electric energy markets, retail electricity sellers, microgrid operators, and renewable electrical energy sources. In addition, in one or more embodiments, the cloud-based server 109 receives data 104 representing the energy needs of individual or groups of electric energy users. In various embodiments, the received data includes user's EV charging behavior, electric heating usage, water heating needs, HVAC usage, or water pumps usage.

In addition, in one or more embodiments, the cloud-based server 109 receives data 106 representing data on specific users of electrical power and their individual behavior. This data 106 may correlate with the aforesaid data 104 and is collected using the same process.

Moreover, in one or more embodiments, the cloud-based server 109 receives data 107, which represents information on any energy storage, including any available EV batteries, power storage batteries, such as Tesla Power Wall, as well as data on any energy coming from Load-Serving-Entities, well known to persons of ordinary skill in the art. Additionally, in one or more embodiments, the cloud-based server 109 receives data 108, which represents information on a specific charging device, such as an EV charging station, being controlled by the systems and methods described herein. Finally, in one or more embodiments, the cloud-based server 109 receives data 110, which describes the locus of power grid priorities, including the information on the needs to maximize revenue, protect assets, balance energy, reduce GHGs, and deliver ancillary services. In various embodiments, relative rank or weight may be assigned to each such priority and included within the data 110. As would be appreciated by persons of ordinary skill in the art, the grid priority information may be communicated using any other means as well.

Once received, some or all of the above data items are analyzed by the cloud-based server 109 in accordance with one or more algorithms embedded therein.

Figure 2:
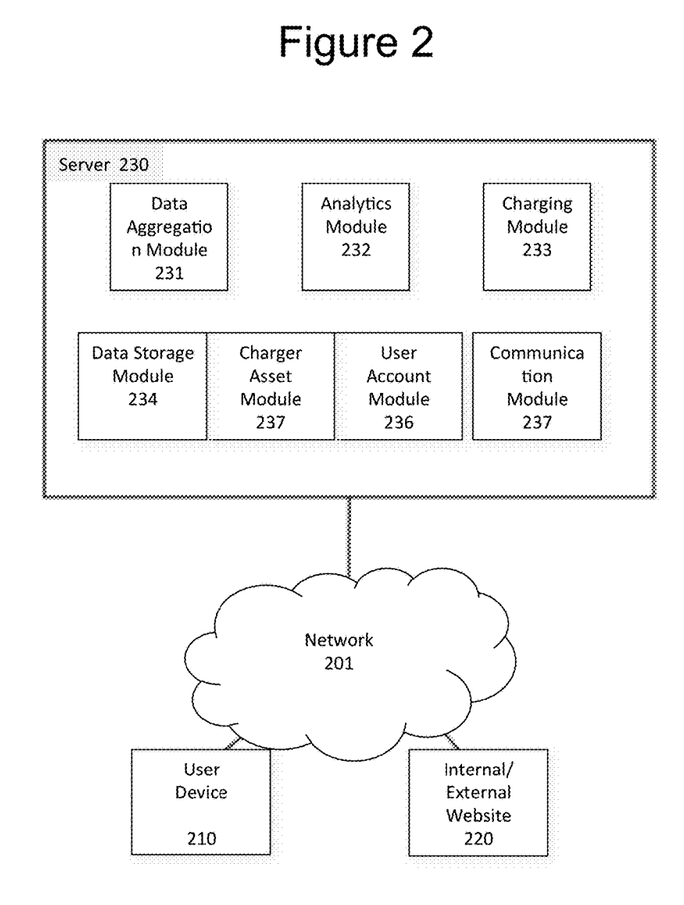
FIG. 2 illustrates a logical diagram of another exemplary embodiment of a computerized system for electrical charging load modeling services to optimize power grid objectives.

FIG. 2 illustrates a logical diagram of another exemplary embodiment of a computerized system for electrical charging load modeling services to optimize power grid objectives. Some of the logical modules shown in FIG. 2 may be deployed on the cloud-based server 230, which may generally correspond to the cloud-based server 109 in FIG. 1. Specifically, deployed on the cloud-based server 230 may be a data aggregation module 231, which collects and aggregates the specific data items illustrated in FIG. 1, as well as other relevant data. The data aggregation module 231 may also furnish the collected and aggregated data to other modules deployed on the cloud-based server 230 or other local or remote software applications, such as user's mobile application.

In one or more embodiments, also deployed on the cloud-based server 230 is an analytics module 232, which identifies various temporal models and/or behaviors associated with the data collected using the systems and methods described herein. In addition, the cloud-based server 230 also executes a charging module 233 operable to determine specific charging patterns for one or more charging assets, such as EV charging stations, based on the data items received and aggregated by the aggregation module 231 and analyzed by the analytics module 232, as described above. The aforesaid charging patterns calculated by the charging module 233 include, without limitation, information on the time intervals when each specific asset will be charged, including the beginning and ending times of the charging operation as well as information on the level of charging during each charging time interval.

In one or more embodiments, additionally deployed on the cloud-based server 230 is a data storage module 234, which stores and manages the data collected as described in FIG. 1. In various embodiments, the data storage module 234 may be implemented based on any now known or later developed type of database management system, such as a relational database management system, including MySQL, Oracle, SQL Server, DB2, SQL Anywhere, PostgreSQL, SQLite, Firebird, redis, MongoDB, Hadoop and/or MaxDB. A cloud-based distributed database, such as Amazon Relational Database Service (Amazon RDS), may also be used in implementing the storage module 234.

In one or more embodiments, additionally deployed on the cloud-based server 230 is a charger asset module 235, which is configured to control charging of select electrical assets in accordance with the aforesaid charging patterns calculated by the charging module 233.

In one or more embodiments, further deployed on the cloud-based server 230 is a user account module 236, which stores and manages various information on users of the described system, their setting, preferences, patterns and other user-related data. In various embodiments, the user account module 236 furnishes the user information to other modules of the system. In one or more embodiments, yet further deployed on the cloud-based server 230 is a communication module 237, which communicatively connects various networked assets of the described system, such as the cloud-based server 230, the chargers, and loads to ensure that the modeled actions described herein can be taken. In various embodiments, for example, the communication module 237 communicates the commands issued by the charger asset module 235 in accordance with the charging patterns calculated by the charging module 233 to the respective EV charger stations. In various embodiments, the communication between the aforesaid networked assets takes place via a network 201, which may be implemented using any now known or later developed wireless or wired network interconnect.

In various embodiments, the exemplary embodiment of the system shown in FIG. 2 may further include one or more user device(s) 210 connected to network 201. The user of the described system may use the user device(s) 210 to access various information and issue various commands to one or more modules deployed on the cloud-based server 230.

Finally, the exemplary embodiment of the system shown in FIG. 2 may further incorporate various web resources 220, such as websites, internal, or external, which may be configured to provide to the users various relevant data and information for user consumption and aiding users in decision-making. Such relevant data and information may include any data items described hereinabove as well as results of analysis of any such data, founds trends, patterns, predictions, etc. The data and analytics may be presented to the user in textual or graphical form. In various embodiments, the user may access the data and analytics using the user device(s) 210.

Figure 3:
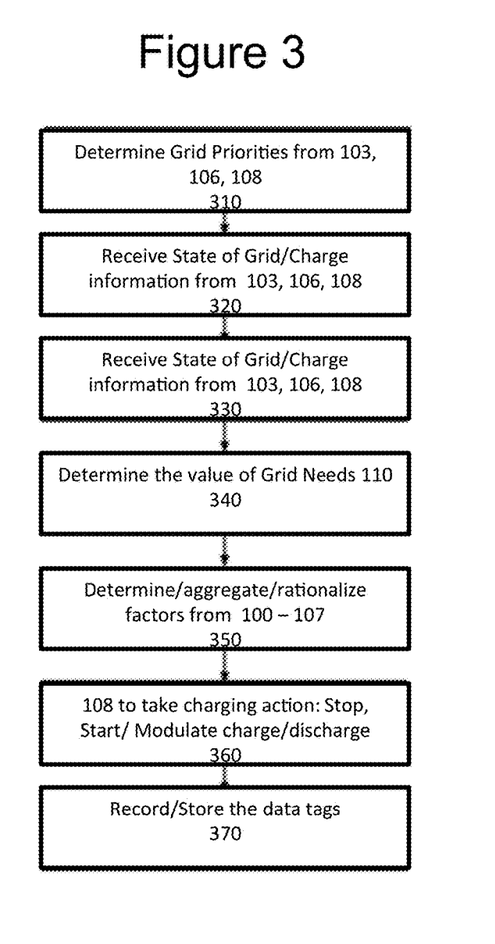
FIG. 3 illustrates an operating sequence of an exemplary embodiment of a computerized system for electrical charging load modeling services to optimize power grid objectives.

FIG. 3 illustrates an operating sequence of an exemplary embodiment of a software algorithm for electrical charging load modeling services to optimize power grid objectives as described herein. First, at step 310, the inventive computerized system for electrical charging load modeling services to optimize power grid objectives uses the power grid data 103, the user data 106 and the data provided by the electrical power charger 108 to automatically determine the grid priorities, see FIG. 1. Subsequently, at steps 320 and 330, the computerized system for electrical charging load modeling services to optimize power grid objectives determines the state of charge based on the aforesaid user, charging, power, renewable, and microgrid-related data.

After that, at step 340, the system determines the optimal parameter values to ensure the maximum for grid efficiency from a cost, environmental, and balancing/services standpoints. At step 350, the computerized system for electrical charging load modeling services to optimize power grid objectives determines, aggregates and rationalizes various factors using data items 100-107 shown in FIG. 1. At step 360, the computerized system for electrical charging load modeling services to optimize power grid objectives directs the electric power charger 108 to take an appropriate charging action, such as to start, stop and/or modulate the charging of an asset. This charging action is determined, as described above, based on the totality of the received diverse data items. Finally, the data tags describing the charging action and any associated data are stored (recorded) on appropriate storage media at step 370.

Figure 4:
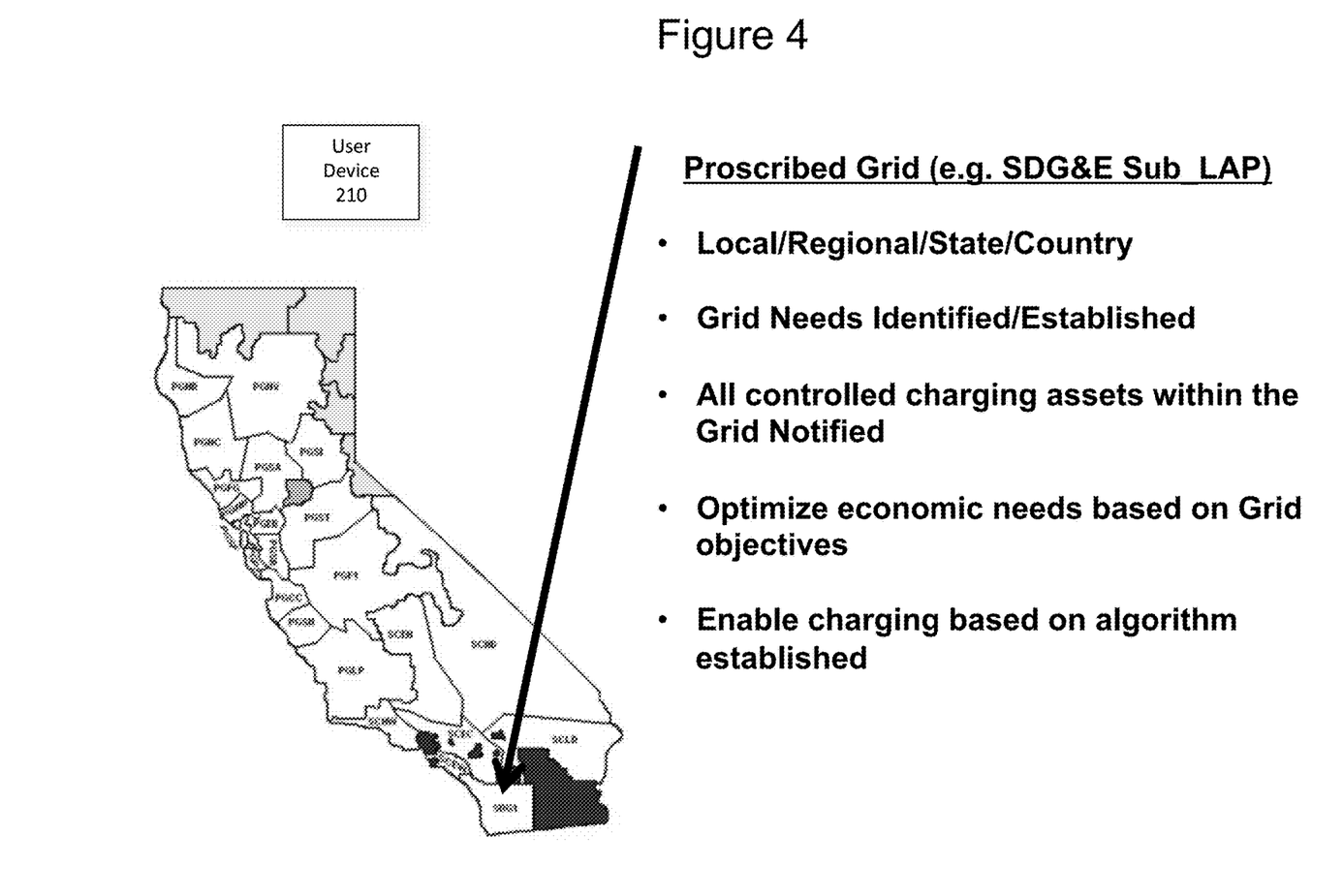
FIG. 4 illustrates a graphical use interface generated on a user's mobile device by an exemplary embodiment of a computerized system for electrical charging load modeling services to optimize power grid objectives.

FIG. 4 illustrates a graphical use interface generated on a user's mobile device 210 by an exemplary embodiment of a computerized system for electrical charging load modeling services to optimize power grid objectives. In one or more embodiments, the user interface displayed by the mobile device 210 is specific to the region/geography, which is being acted upon to maximize revenue from a specific electricity market.

Exemplary Computer Platform

Figure 5:
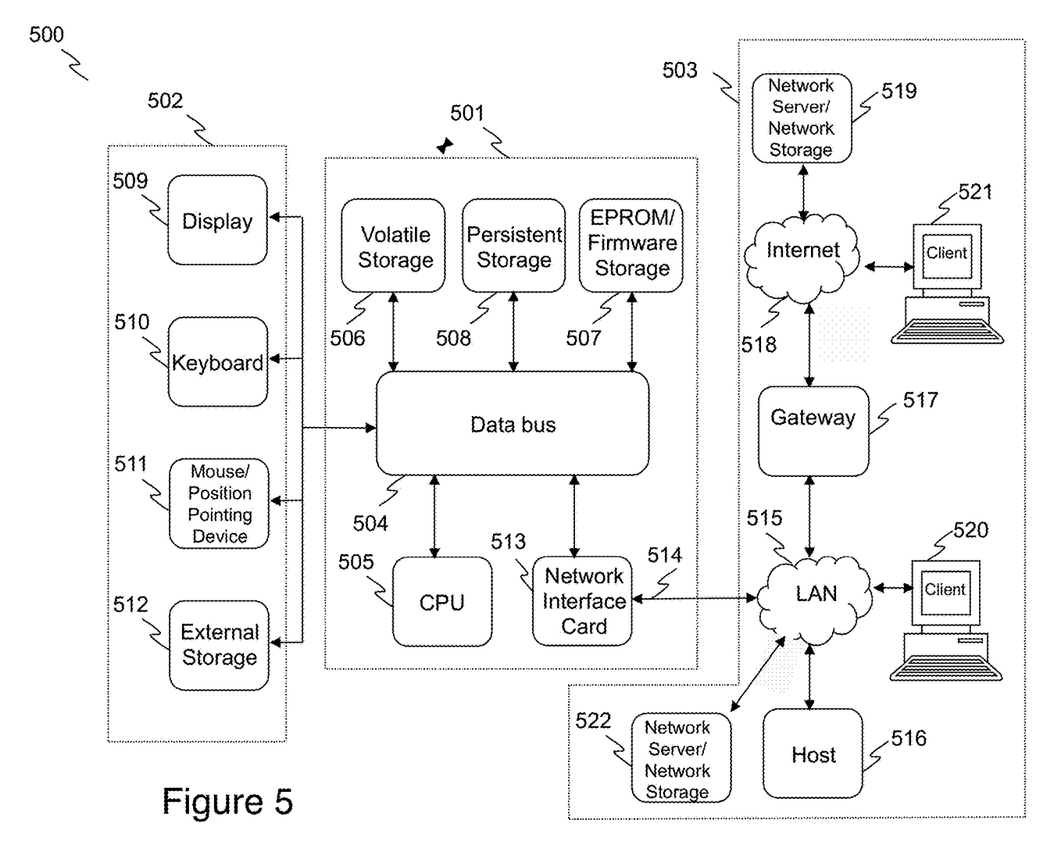
FIG. 5 is a block diagram that illustrates an embodiment of a computer/server platform upon which an embodiment of the inventive system for electrical charging load modeling services to optimize power grid objectives may be deployed.

FIG. 5 is a block diagram that illustrates an embodiment of a computer/server system 500 upon which an embodiment of the inventive methodology may be implemented. The system 500 includes a computer/server platform 501, peripheral devices 502 and network resources 503. In various embodiments the aforesaid computer/server system 500 may function as the cloud-based servers 109 and/or 230 described above.

The computer platform 501 may include a data bus 505 or other communication mechanism for communicating information across and among various parts of the computer platform 501, and a processor 505 coupled with bus 501 for processing information and performing other computational and control tasks. Computer platform 501 also includes a volatile storage 506, such as a random access memory (RAM) or other dynamic storage device, coupled to bus 505 for storing various information as well as instructions to be executed by processor 505. The volatile storage 506 also may be used for storing temporary variables or other intermediate information during execution of instructions by processor 505. Computer platform 501 may further include a read only memory (ROM or EPROM) 507 or other static storage device coupled to bus 504 for storing static information and instructions for processor 505, such as basic input-output system (BIOS), as well as various system configuration parameters. A persistent storage device 508, such as a magnetic disk, optical disk, or solid-state flash memory device is provided and coupled to bus 501 for storing information and instructions.

Computer platform 501 may be coupled via bus 505 to a display 509, such as a cathode ray tube (CRT), plasma display, or a liquid crystal display (LCD), for displaying information to a system administrator or user of the computer platform 501. An input device 510, including alphanumeric and other keys, is coupled to bus 501 for communicating information and command selections to processor 505. Another type of user input device is cursor control device 511, such as a mouse, a trackball, or cursor direction keys for communicating direction information and command selections to processor 505 and for controlling cursor movement on display 509. This input device typically has two degrees of freedom in two axes, a first axis (e.g., x) and a second axis (e.g., y), that allows the device to specify positions in a plane.

An external storage device 512 may be coupled to the computer platform 501 via bus 505 to provide an extra or removable storage capacity for the computer platform 501. In an embodiment of the computer system 500, the external removable storage device 512 may be used to facilitate exchange of data with other computer systems.

The invention is related to the use of computer system 500 for implementing the techniques described herein. In an embodiment, the inventive system may reside on a machine such as computer platform 501. According to one embodiment of the invention, the techniques described herein are performed by computer system 500 in response to processor 505 executing one or more sequences of one or more instructions contained in the volatile memory 506. Such instructions may be read into volatile memory 506 from another computer-readable medium, such as persistent storage device 508. Execution of the sequences of instructions contained in the volatile memory 506 causes processor 505 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 505 for execution. The computer-readable medium is just one example of a machine-readable medium, which may carry instructions for implementing any of the methods and/or techniques described herein. Such a medium may take many forms, including but not limited to, non-volatile media and volatile media. Non-volatile media includes, for example, optical or magnetic disks, such as storage device 508. Volatile media includes dynamic memory, such as volatile storage 506.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, a flash drive, a memory card, any other memory chip or cartridge, or any other medium from which a computer can read.

Various forms of computer readable media may be involved in carrying one or more sequences of one or more instructions to processor 505 for execution. For example, the instructions may initially be carried on a magnetic disk from a remote computer. Alternatively, a remote computer can load the instructions into its dynamic memory and send the instructions over a telephone line using a modem. A modem local to computer system can receive the data on the telephone line and use an infra-red transmitter to convert the data to an infra-red signal. An infra-red detector can receive the data carried in the infra-red signal and appropriate circuitry can place the data on the data bus 505. The bus 505 carries the data to the volatile storage 506, from which processor 505 retrieves and executes the instructions. The instructions received by the volatile memory 506 may optionally be stored on persistent storage device 508 either before or after execution by processor 505. The instructions may also be downloaded into the computer platform 501 via Internet using a variety of network data communication protocols well known in the art.

The computer platform 501 also includes a communication interface, such as network interface card 513 coupled to the data bus 505. Communication interface 513 provides a two-way data communication coupling to a network link 515 that is coupled to a local network 515. For example, communication interface 513 may be an integrated services digital network (ISDN) card or a modem to provide a data communication connection to a corresponding type of telephone line. As another example, communication interface 513 may be a local area network interface card (LAN NIC) to provide a data communication connection to a compatible LAN. Wireless links, such as well-known 802.11a, 802.11b, 802.11g and Bluetooth may also used for network implementation. In any such implementation, communication interface 513 sends and receives electrical, electromagnetic or optical signals that carry digital data streams representing various types of information.

Network link 515 typically provides data communication through one or more networks to other network resources. For example, network link 515 may provide a connection through local network 515 to a host computer 516, or a network storage/server 517. Additionally or alternatively, the network link 513 may connect through gateway/firewall 517 to the wide-area or global network 518, such as an Internet. Thus, the computer platform 501 can access network resources located anywhere on the Internet 518, such as a remote network storage/server 519. On the other hand, the computer platform 501 may also be accessed by clients located anywhere on the local area network 515 and/or the Internet 518. The network clients 520 and 521 may themselves be implemented based on the computer platform similar to the platform 501.

Local network 515 and the Internet 518 both use electrical, electromagnetic or optical signals that carry digital data streams. The signals through the various networks and the signals on network link 515 and through communication interface 513, which carry the digital data to and from computer platform 501, are exemplary forms of carrier waves transporting the information.

Computer platform 501 can send messages and receive data, including program code, through the variety of network(s) including Internet 518 and LAN 515, network link 515 and communication interface 513. In the Internet example, when the system 501 acts as a network server, it might transmit a requested code or data for an application program running on client(s) 520 and/or 521 through Internet 518, gateway/firewall 517, local area network 515 and communication interface 513. Similarly, it may receive code from other network resources.

The received code may be executed by processor 505 as it is received, and/or stored in persistent or volatile storage devices 508 and 506, respectively, or other non-volatile storage for later execution.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive.

Moreover, other implementations of the invention will be apparent to those skilled in the art from consideration of the specification and practice of the invention disclosed herein. Various aspects and/or components of the described embodiments may be used singly or in any combination in systems and methods for electrical charging load modeling services to optimize power grid objectives. It is intended that the specification and examples be considered as exemplary only, with a true scope and spirit of the invention being indicated by the following claims.

What is claimed is:

1. A computerized system for electrical charging load modeling to optimize power grid objectives, the system comprising:
   a. a plurality of charging assets; and
   b. a cloud server comprising at least one processing unit, the cloud server comprising:
      i. a data aggregation module configured to collect and aggregate a plurality of information items;
      ii. an analytics module configured to identify at least one temporal model associated with the data collected and aggregated by the data aggregation module;
      iii. a charging module configured to determine a charging pattern for each of the plurality of charging assets, the charging pattern comprising information on time intervals when each of the plurality of charging assets is to be charged, including the beginning and ending times of the charging operation and information on a level of charging during each charging time interval;
      iv. a charger asset module configured to control charging of the plurality of charging assets in accordance with the determined charging patterns by issuing a control command to each of the plurality of charging assets; and
      v. a communication module for communicating the control command issued by the charger asset module to the respective charging asset via a data network.

2. The computerized system for electrical charging load modeling to optimize power grid objectives of claim 1, wherein the plurality of information items comprises a power grid data.

3. The computerized system for electrical charging load modeling to optimize power grid objectives of claim 1, wherein the plurality of information items comprises a data collected from local grids, the local grids comprising residential renewables, local or regional microgrids.

4. The computerized system for electrical charging load modeling to optimize power grid objectives of claim 1, wherein the plurality of information items comprises data originating from an external environment.

5. The computerized system for electrical charging load modeling to optimize power grid objectives of claim 4, wherein the data originating from an external environment comprises weather-related information, solar activity information, cloud-cover information or earthquake information.

6. The computerized system for electrical charging load modeling to optimize power grid objectives of claim 1, wherein the plurality of information items comprises data representing energy needs of individual or groups of electric energy users.

7. The computerized system for electrical charging load modeling to optimize power grid objectives of claim 1, wherein the plurality of information items comprises data on specific users of electrical power and their individual behavior.

8. The computerized system for electrical charging load modeling to optimize power grid objectives of claim 1, wherein the plurality of information items comprises data on energy storage, including any available EV batteries, power storage batteries, as well as data on any energy coming from Load-Serving-Entities.

9. The computerized system for electrical charging load modeling to optimize power grid objectives of claim 1, wherein the plurality of information items comprises data on a specific one of the plurality of charging assets.

10. The computerized system for electrical charging load modeling to optimize power grid objectives of claim 1, wherein the plurality of information items comprises data on a power grid priorities.

11. The computerized system for electrical charging load modeling to optimize power grid objectives of claim 1, wherein the data on a power grid priorities comprises information on maximization of revenue, protecting assets, balancing energy, reducing emissions, or delivering ancillary services.

12. A computer-implemented method for electrical charging load modeling to optimize power grid objectives, the method being performed in connection with a plurality of charging assets and a cloud server comprising at least one processing unit, the method comprising:
   i. collecting and aggregating a plurality of information items;
   ii. identifying at least one temporal model associated with the collected and aggregated plurality of information items;
   iii. determining a charging pattern for each of the plurality of charging assets, the charging pattern comprising information on time intervals when each of the plurality of charging assets is to be charged, including the beginning and ending times of the charging operation and information on a level of charging during each charging time interval;
   iv. controlling charging of the plurality of charging assets in accordance with the determined charging patterns by issuing a control command to each of the plurality of charging assets; and
   v. communicating the control command issued by the charger asset module to the respective charging asset via a data network.

13. The computer-implemented method for electrical charging load modeling to optimize power grid objectives of claim 12, wherein the plurality of information items comprises a power grid data.

14. The computer-implemented method for electrical charging load modeling to optimize power grid objectives of claim 12, wherein the plurality of information items comprises a data collected from local grids, the local grids comprising residential renewables, local or regional microgrids.

15. The computer-implemented method for electrical charging load modeling to optimize power grid objectives of claim 12, wherein the plurality of information items comprises data originating from an external environment.

16. The computer-implemented method for electrical charging load modeling to optimize power grid objectives of claim 15, wherein the data originating from an external environment comprises weather-related information, solar activity information, cloud-cover information or earthquake information.

17. The computer-implemented method for electrical charging load modeling to optimize power grid objectives of claim 12, wherein the plurality of information items comprises data representing energy needs of individual or groups of electric energy users.

18. The computer-implemented method for electrical charging load modeling to optimize power grid objectives of claim 12, wherein the plurality of information items comprises data on specific users of electrical power and their individual behavior.

19. The computer-implemented method for electrical charging load modeling to optimize power grid objectives of claim 12, wherein the plurality of information items comprises data on energy storage, including any available EV batteries, power storage batteries, as well as data on any energy coming from Load-Serving-Entities.

20. The computer-implemented method for electrical charging load modeling to optimize power grid objectives of claim 12, wherein the plurality of information items comprises data on a specific one of the plurality of charging assets.

* * * * *